United States Patent [19]

Liechti

[11] Patent Number: 4,704,452
[45] Date of Patent: Nov. 3, 1987

[54] AZO DYES CONTAINING ARALKYL-NITROPHENYL DIAZO COMPONENTS

[75] Inventor: Peter Liechti, Arisdorf, Switzerland

[73] Assignee: Ciba-Geigy Corporation, Ardsley, N.Y.

[21] Appl. No.: 810,962

[22] Filed: Dec. 19, 1985

[30] Foreign Application Priority Data

Dec. 20, 1984 [CH] Switzerland ............ 6055/84

[51] Int. Cl.$^4$ .............. C09B 29/01; C09B 29/20; C09B 29/33; C09B 29/36

[52] U.S. Cl. .................... 534/772; 534/573; 534/649; 534/650; 534/739; 534/770; 534/771; 534/773; 534/787; 534/790; 534/791; 534/792; 534/794; 534/802; 534/803; 534/832; 534/843; 534/850; 534/856; 534/859; 534/863; 534/875; 534/881; 564/305; 564/442

[58] Field of Search .......... 534/649, 650, 856, 859, 534/832, 790, 791, 794, 770, 771, 772, 739

[56] References Cited

U.S. PATENT DOCUMENTS

| 2,221,020 | 11/1940 | Dickey | 534/649 X |
| 2,245,259 | 6/1941 | Dickey | 534/859 X |
| 3,580,902 | 5/1971 | Angliker | 534/859 X |
| 3,734,857 | 5/1973 | Moiso et al. | 534/856 X |
| 4,011,209 | 3/1977 | De Feo et al. | 534/859 X |

FOREIGN PATENT DOCUMENTS

| 0030314 | 6/1981 | European Pat. Off. | 534/649 |
| 3012863 | 10/1981 | Fed. Rep. of Germany | 534/649 |
| 53-98932 | 8/1978 | Japan | 534/859 |

Primary Examiner—Floyd D. Higel
Attorney, Agent, or Firm—Edward McC. Roberts; Meredith C. Findlay; Kevin T. Mansfield

[57] ABSTRACT

Monoazo compounds of the formula

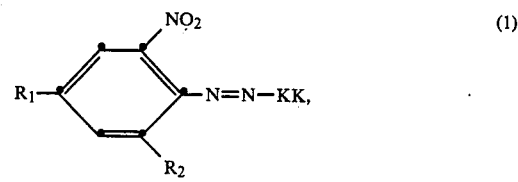

in which one of the two substituents $R_1$ or $R_2$ or both substituents are $C_3$–$C_8$-alkyl or a group of the formula

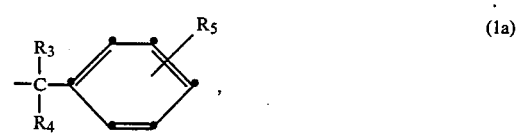

in which $R_3$ and $R_4$ are independently of each other hydrogen or $C_1$–$C_4$-alkyl and $R_5$ is hydrogen, halogen or $C_1$–$C_4$-alkyl and the other of the two substitutents $R_1$ or $R_2$, when the two are not $C_3$–$C_8$-alkyl or a group of the formula (1a), is hydrogen, halogen or $C_1$–$C_4$-alkyl, and KK is the radical of a coupling component which is free of water-solubilizing groups the two described. These compounds can be used as dyes for dyeing or printing for example polyester fibre materials.

9 Claims, No Drawings

AZO DYES CONTAINING ARALKYL-NITROPHENYL DIAZO COMPONENTS

The present invention relates to novel monoazo compounds, to methods for their preparation and to their use as dyes for dyeing and printing cellulosic or synthetic hydrophobic fibre material, in particular polyester.

The novel monoazo compounds conform to the formula

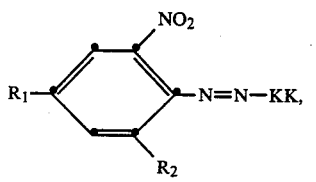

(1)

in which one of the two substituents $R_1$ or $R_2$ is, or both substituents are, $C_3$-$C_8$-alkyl or a group of the formula

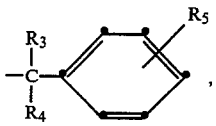

(1a)

in which $R_3$ and $R_4$ are independently of each other hydrogen or $C_1$-$C_4$-alkyl and $R_5$ is hydrogen, halogen or $C_1$-$C_4$-alkyl, and the other of the two substituents $R_1$ and $R_2$, when the two are not $C_3$-$C_8$-alkyl or a group of the formula (1a), is hydrogen, halogen or $C_1$-$C_4$-alkyl, and KK is the radical of a coupling component which is free of water-solubilising groups.

Of the substituents $R_1$ and $R_2$, either or both can be $C_3$-$C_8$-alkyl or a group of the formula (1a). Preferably, however, only one of the two substituents $R_1$ and $R_2$ is $C_3$-$C_8$-alkyl or a group of the formula (1a). In that case, the other substituent is hydrogen, halogen or $C_1$-$C_4$-alkyl.

$C_3$-$C_8$-alkyl radicals $R_1$ and $R_2$ can be straight-chain or branched, the branched radicals being preferable. They preferably have 4-8 C atoms. Specific examples are: t-butyl, isopropyl, 2-ethylhexyl, t-octyl and i-pentyl.

In the stated description, halogen is preferably chlorine, fluorine or bromine, in particular chlorine, unless otherwise stated.

In practically important compounds of the formula 1, $R_1$ is $C_3$-$C_8$-alkyl or a group of the formula (1a) and $R_2$ is hydrogen, halogen or $C_1$-$C_4$-alkyl, preferably hydrogen.

$R_1$ and/or $R_2$ are in particular a group of the formula 1a, but preferably only one of the two groups. $R_1$ in the meaning of a group of the formula (1a) is preferred. In that case $R_2$ is hydrogen, halogen or $C_1$-$C_4$-alkyl, preferably hydrogen.

In preferred compounds of the formula (1) at least one of the two substituents $R_3$ and $R_4$ is different from hydrogen. In particularly noteworthy compounds, $R_3$ or $R_4$ or $R_3$ and $R_4$ are methyl.

$R_5$ is preferably hydrogen, chlorine or methyl, in particular hydrogen.

The coupling component KK can be any coupling component customary in azo chemistry and known from the relevant literature as long as it does not contain any water-solubilising groups, i.e. no ionic groups, for example no sulfo, carboxyl or quaternary ammonium groups (coupling components for disperse azo dyes).

Examples from the large number of these are: coupling components of the benzene series, of the naphthalene series, open-chain active methylene compounds (for example acylacetarylamide) and of the heterocyclic series. The heterocyclic coupling components are preferred.

Examples of the state radicals of coupling components KK are the radicals from the series of the acylacetarylamides, phenols, pyridones, quinolines, pyrazoles, indoles, diphenylamines, anilines, aminopyridines, pyrimidines, pyrimidones, naphthols, naphthylamines, aminothiazoles, thiophenes or hydroxypyridines.

Particularly noteworthy radicals KK are those from the series of the acetoacetanilides, phenols, anilines, diphenylamines, naphthylamines, naphthols, indoles, pyridones, pyrazoles, quinolines, quinolones, aminopyridines, in particular 2,6-diaminopyridines, the stated heterocyclic KK, in particular those from the series of the pyridones, being preferred.

Examples of radicals KK from the aniline and diphenylamine series are those of the formulae

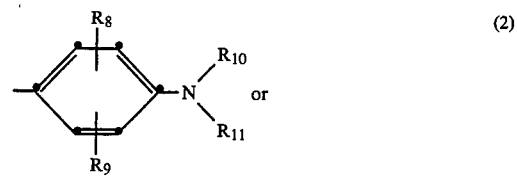

(2)

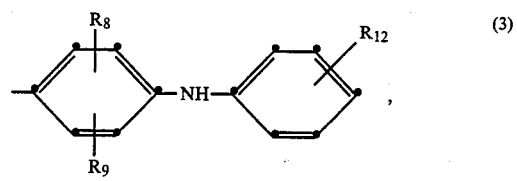

(3)

in which $R_8$ is hydrogen, $C_1$-$C_4$-alkyl, OH, $C_1$-$C_4$-alkoxy, halogen or acylamino (for example alkanoylamino, benzoylamino, alkylsulfonyl, phenylsulfonyl), $R_9$ is hydrogen, $C_1$-$C_4$-alkyl, halogen, OH, $C_1$-$C_4$-alkoxy or amino, or $R_8$ and $R_9$ together are the complement to the fused-on benzo or tetrahydrobenzo radical, $R_{10}$ and $R_{11}$ are independently of each other hydrogen, $C_1$-$C_8$-alkyl, alkenyl, cycloalkyl, aryl, benzyl, phenethyl, $C_1$-$C_4$-hydroxyalkyl, $C_1$-$C_5$-cyanoalkyl or $C_1$-$C_4$-halogenoalkyl, or $R_{10}$ and $R_{11}$ are together with the N atom the complement of a morpholine, piperidine or piperazine radical, or $R_{10}$ is together with $R_9$ in the ortho-position relative to the amino group the complement to a fused-on 5- or 6-membered N heterocylc (thereby forming with the benzene ring for example an indolene or tetrahydroquinoline ring), and $R_{12}$ is hydrogen, $C_1$-$C_4$-alkyl, halogen, nitro or $C_1$-$C_4$-alkoxy.

Therein $R_9$ is preferably in the 3-position relative to the amino group and is in particular hydrogen or acylamino, for example $C_1$-$C_5$-alkanoylamino.

Examples of radicals KK from the diaminopyridine series are those of the formula

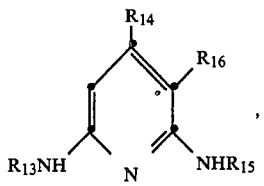   (4)

in which $R_{16}$ is hydrogen, CN, $C_1$-$C_4$-alkyl, $NO_2$, halogen; $R_{13}$ and $R_{15}$ are hydrogen, substituted or unsubstituted alkyl, alkenyl, cyclohexyl, aryl, benzyl, phenethyl (for example one of the radicals $R_{13}$ and $R_{15}$ being hydrogen or phenyl which can be substituted one or more times by Cl, $CH_3$, $C_2H_5$, tert.-butyl, phenoxy, methoxy, ethoxy, propoxy or butoxy and the other of the radicals $R_{13}$ and $R_{15}$ being hydrogen, unsubstituted or $C_1$-$C_4$-alkoxy- or phenyl-substituted $C_1$-$C_8$-alkyl, allyl, cyclopentyl, cyclohexyl, methylcyclohexyl,

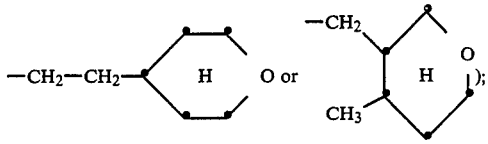

and $R_{14}$ is hydrogen, $CH_3$, $C_2H_5$ or $C_3H_7$; or those of the formulae

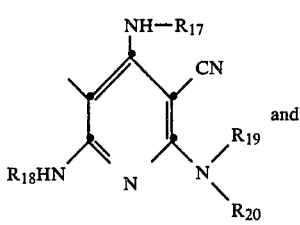   (5)

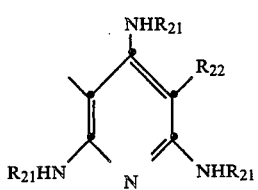   (6)

in which
$R_{17}$ and $R_{18}$ are a $C_1$-$C_8$-alkyl group which can be substituted by $C_1$-$C_8$-alkoxy, or are hydrogen,
$R_{19}$ and $R_{20}$ are each hydrogen, a $C_1$-$C_8$-alkyl group which can be substituted by hydroxyl, amino, $C_1$-$C_8$-alkoxy or $NT_1T_2$, a cycloalkyl group which can be substituted by methyl radicals or a benzyl group which can be substituted by 1 to 3 chlorine, $C_1$-$C_4$-alkyl or $C_1$-$C_4$-alkoxy, or $R_{19}$ and $R_{20}$ are the complement to a preferably saturated 5- or 6-membered heterocyclic ring which can additionally contain a further hetero atom as a ring member, in particular the complement to a pyrrolidine, piperidine, piperazine or morpholine ring, $T_1$ and $T_2$ each being $C_1$-$C_8$-alkyl,
$R_{21}$ is H, $C_1$-$C_4$-alkyl, alkenyl, cyclohexyl, aryl, benzyl and
$R_{22}$ is CN, COOH, COOalkyl, COOcyclohexyl, COOaryl, COObenzyl, alkyl($C_1$-$C_4$), $NO_2$, halogen, $SO_2$-alkyl($C_1$-$C_4$).

Examples of radicals KK from the pyrazoline series are those of the formula

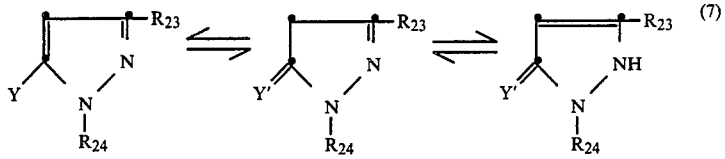   (7)

in which
Y is OH or $NH_2$, Y' is O or NH,
$R_{24}$ is H, $C_1$-$C_4$-alkyl, alkenyl, cyclohexyl, aryl, benzyl or phenylethyl and
$R_{23}$ is $R_{24}$ or $COOR_{24}$ or $CONHR_{24}$.

Examples of radicals KK from the pyridone series are those of the formula

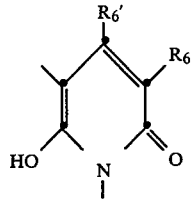   (8)

in which $R_6$ is alkyl, CN, $CONH_2$ or $SO_2NH_2$, $R_6'$ is alkyl and $R_7$ is hydrogen, alkenyl, aryl or preferably substituted or unsubstituted $C_1$-$C_8$-alkyl.

Examples of open-chain active methylene compounds for use as radicals KK are as follows:
(a) Esters and amides of acetoacetic acid:
These esters and amides can be easily prepared by reacting OH— and NH-containing compounds with diketene, as described for example in Houben-Weyl, Methoden der organischen Chemie [Methods of organic chemistry], volume 7, part 4, oxygen compounds II. Such coupling components conform for example to the formula $$Z—CH_2—CO—CH_2—CO—R_{25} \quad (9)$$

where $R_{25}$ is substituted or unsubstituted alkoxy having 1-8 carbon atoms or cycloalkoxy, substituted or unsubstituted benzyloxy or phenoxy which can be substituted by $C_1$-$C_4$-alkyl, $C_1$-$C_4$-alkoxy, halogen, acylamino, carboxamido, sulfonamido, dialkylamino, $C_1$-$C_4$-alkylcarbonyl, $C_1$-$C_4$-alkoxycarbonyl, OH or phenyl.

$R_{25}$ can also be a radical of the formula

where
R$_{26}$ is C$_1$–C$_4$-alkyl or preferably hydrogen and
R$_{27}$ is hydrogen, unsubstituted or substituted (for example by halogen, OH, alkoxy, amino) C$_1$–C$_8$-alkyl or cycloalkyl or substituted or unsubstituted benzyl or a phenyl radical of the formula

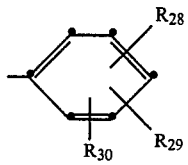

where
R$_{28}$ is hydrogen, C$_1$–C$_4$-alkyl, C$_1$–C$_4$-alkoxy, halogen, cyano, nitro, OH, dialkylamino, phenylamino,

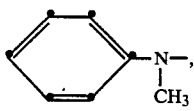

phenyl, acylamino, substituted or unsubstituted carboxamido, substituted or unsubstituted sulfonamido, C$_1$–C$_4$-alkylcarbonyl, C$_1$–C$_4$-alkoxycarbonyl, or C$_1$–C$_4$-alkylsulfonyl.
R$_{29}$ is independently of R$_{28}$ hydrogen, C$_1$–C$_4$-alkyl, C$_1$–C$_4$-alkoxy or halogen,
R$_{30}$ is independently of R$_{28}$ and R$_{29}$ hydrogen, halogen or C$_1$–C$_4$-alkyl.
R$_{27}$ can also be together with R$_{26}$ and if desired with inclusion of further hetero atoms a 5- or 6-membered saturated or unsaturated ring, for example of the formula

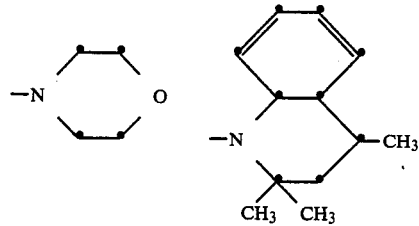

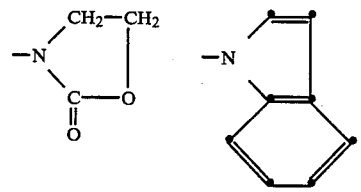

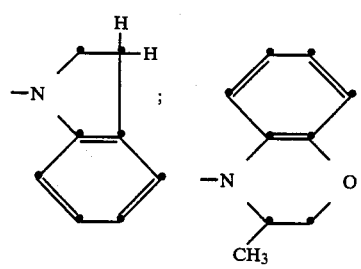

-continued

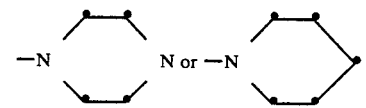

R$_{25}$ also has the meaning of a heterocyclic substituted amino group, for example of the formula

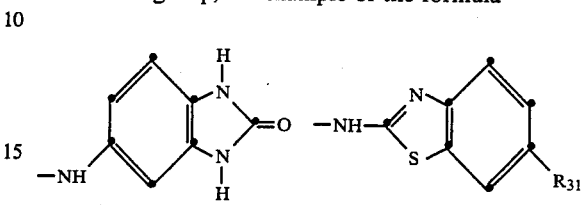

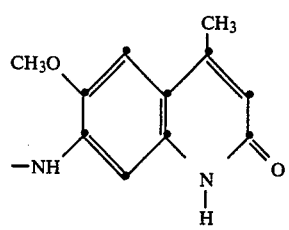

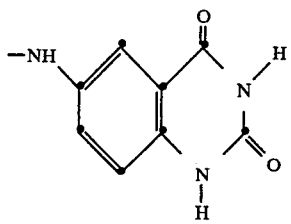

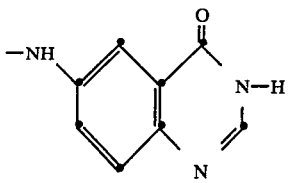

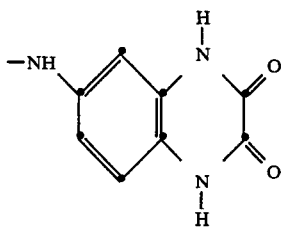

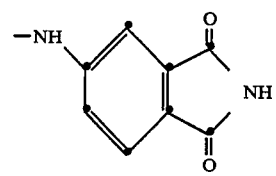

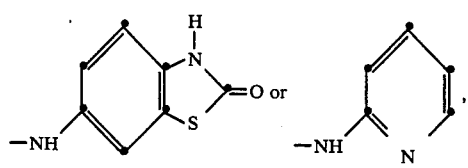

where $R_{31}$ is methyl, ethyl, methoxy, ethoxy or preferably hydrogen or acetylamino.

$R_{25}$ is also a radical of the formula

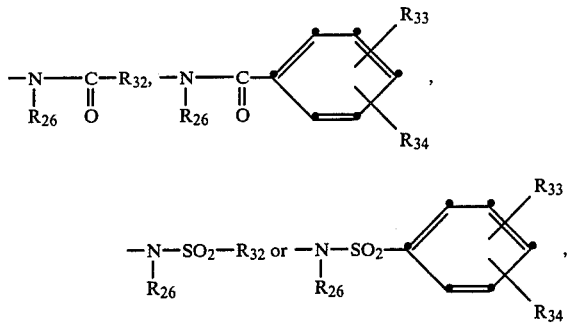

where $R_{26}$ is as defined above and $R_{32}$ is substituted or unsubstituted alkyl having 1–8 carbon atoms, cycloalkyl, amino, alkylamino, dialkylamino, phenylamino, alkoxy or phenoxy and $R_{33}$ and $R_{34}$ are independently of each other hydrogen, $C_1$–$C_4$-alkyl, $C_1$–$C_4$-alkoxy, halogen or dialkylamino.

Z is halogen or preferably hydrogen or an aliphatic or aromatic, substituted or unsubstituted amino group.

(b) Esters and amides of malonic acid as coupling components conform, for example, to the formula

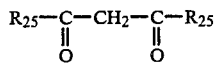

where $R_{25}$ is as defined above.

(c) Esters and amides of cyanoacetic acid as coupling components conform, for example, to the formula

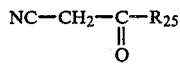

where $R_{25}$ is as defined above.

Preferred radicals of open-chain coupling components are those of acylacetaryl esters and in particular of acylacetarylamides, especially of acetoacetanilides. Examples thereof are radicals of the formula

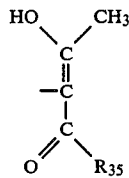 (10)

in which $R_{35}$ is —$OR_{36}$, $R_{36}$ being $C_1$–$C_4$-alkyl or phenyl, or preferably —NH—$R_{37}$ or

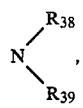

in which $R_{38}$ is $C_1$–$C_4$-alkyl, $R_{39}$ is $C_1$–$C_4$alkyl or phenyl or $R_{38}$ and $R_{39}$ are together the complement to a morpholine, piperidine, piperazine, pyrrolidine or

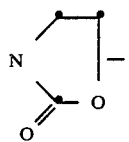

ring and $R_{37}$ is hydrogen, $C_1$–$C_4$-alkyl, phenyl-($C_1$–$C_4$)-alkyl, cyclohexyl, cyclohexyl-($C_1$–$C_4$)-alkyl, benzoyl, naphthyl or a group of the formula

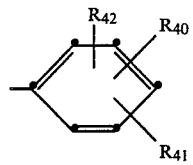 (10a)

where $R_{40}$ is hydrogen, halogen, $C_1$–$C_4$-alkyl, $C_1$–$C_4$-alkoxy, —NHCO-alkyl($C_1$–$C_4$) or —$SO_2NH_2$, $R_{41}$ is hydrogen, halogen, $C_1$–$C_4$-alkyl or $C_1$–$C_4$-alkoxy and $R_{42}$ is hydrogen or halogen, in particular those in which $R_{35}$ is $NHR_{37}$ in which $R_{37}$ conforms to the formula (10a) in which $R_{40}$ is hydrogen, $C_1$–$C_4$-alkyl, $C_1$–$C_4$-alkoxy or halogen and $R_{41}$ and $R_{42}$ are each hydrogen.

Examples of radicals KK from the series of the phenols are those of the formula

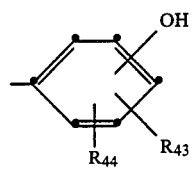 (11)

in which $R_{43}$ and $R_{44}$ are independently of each other hydrogen, $C_1$–$C_4$-alkyl, OH, $C_1$–$C_4$-alkoxy, alkoxycarbonyl, acyl, acylamino, alkenyl, cyclopentyl, cyclohexyl, aryl, benzyl, phenethyl or halogen.

Examples of radicals KK from the naphthylamine and naphthol series are those of the formula

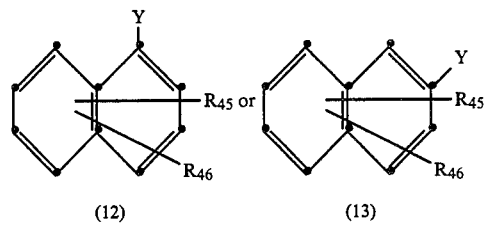

in which Y is hydroxyl or amino, $R_{45}$ is hydrogen, amino or hydroxyl and $R_{46}$ is hydrogen,

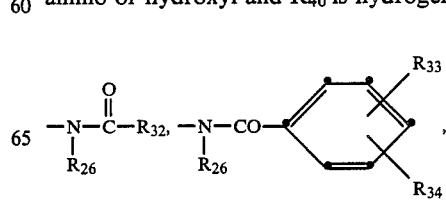

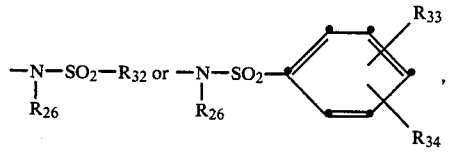

in which $R_{26}$, $R_{32}$, $R_{33}$ and $R_{34}$ are as defined above.

Examples of radicals KK from the pyrimidine and pyrimidone series are those of the formulae

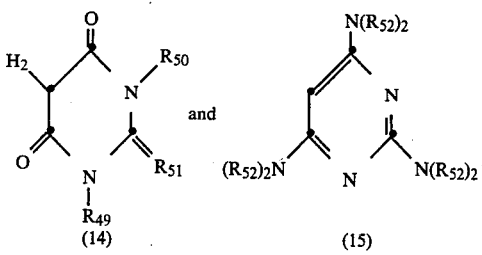

in which $R_{49}$ and $R_{50}$ are hydrogen or $C_1$–$C_4$-alkyl and $R_{51}$ is O or N—CN and each $R_{52}$ is independently of the other hydrogen, substituted or unsubstituted alkyl, alkenyl, cyclopentyl, cyclohexyl or aryl.

Examples of radicals KK from the indole and quinoline series are those of the formulae

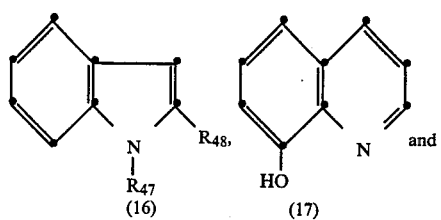

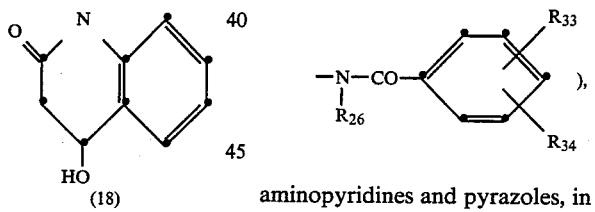

in which $R_{47}$ is hydrogen or substituted or unsubstituted alkyl and $R_{48}$ is alkyl or aryl.

In so far as in the above definitions and elsewhere in the description alkyl groups as such or as part of assembled groups are referred to as "substituted or unsubstituted", such substituents can be for example, unless otherwise stated: hydroxyl, cyano, halogen (for example Cl, Br), $C_1$–$C_4$-alkoxy, phenoxy or phenyl (both can be substituted 1–3 times by halogen, methyl or methoxy), amino, alkylamino or dialkylamino. Again, unless otherwise stated, alkyl groups as such or as part of assembled groups preferably have 1–8, in particular 1–4, C atoms, alkenyl groups preferably 2–8, in particular 2–4, C atoms and cycloalkyl groups preferably 5 or 6 C atoms.

Examples of groups referred to as nonionic substituents are $C_1$–$C_4$-alkyl, $C_1$–$C_4$-alkoxy and halogen. Aryl is preferably to be understood as meaning naphthyl and in particular phenyl which is unsubstituted or for example substituted by the preceding nonionic groups.

Acyl is in particular alkanoyl (alkoxycarbonyl), substituted or unsubstituted benzoyl (substituents as for phenyl), alkylsulfonyl, phenylsulfonyl, mono- or dialkylaminocarbonyl, benzylaminocarbonyl or dialkylaminosulfonyl, but in particular alkylcarbonyl (alkanoyl).

In preferred compounds of the formula (1), KK is the radical of a coupling component from the series of the pyridones (for example of the formula (8)), of the pyrazoles (for example of the formula (7), in particular those in which $R_{23}$ is alkyl, Y is OH or $NH_2$ and $R_{24}$ is alkyl, benzyl or phenyl), of the aminopyridines (for example of the formula (4), in particular those in which $R_{13}$ and $R_{15}$ are H or alkyl, $R_{14}$ is hydrogen or amino and $R_{16}$ is hydrogen, or of the formula (5), inparticular those in which $R_{17}$ and $R_{18}$ are H or alkyl and $R_{19}$ and $R_{20}$ are H, alkyl or together the complement to a pyrrolidine, piperidine, piperazine or morpholine ring), of the indole series (for example of the formula (16), in particular those in which $R_{47}$ is hydrogen or alkyl and $R_{48}$ is alkyl or phenyl), of the 2-quinolones (for example of the formula (18)), of the phenol series (for example of the formula (11)), of the naphthol and naphthylamine series (for example of the formula (12) and (13)), of the aniline and diphenylamine series (for example of the formula (2) and (3), in particular those in which $R_8$ is hydrogen or alkanoylamino, $R_9$ is hydrogen and $R_{10}$ and $R_{11}$ are alkyl) and of the acylacetate esters or amides, such as of the acylacetarylamides (for example of the formula (9), in particular of the formula (10)).

In particularly noteworthy compounds of the formula (1), KK is the radical of a coupling component from the series of the pyridones, acylacetarylamides, napthols (in particular of the naphtholcarbanilides of the formula (13) in which Y is OH, $R_{45}$ is H and $R_{46}$ is aminopyridines and pyrazoles, in particular of the pyridones, acylacetarylanilides, aminopyridines and naphthols (including the preferred radicals specified in the preceding paragraph). In the formula (1), KK is particularly preferably the radical of a pyridone coupling component, in particular of the formula (8), for example that in which $R_6$ is CN, $R_6'$ is $CH_3$ and $R_7$ is substituted or unsubstituted $C_1$–$C_8$-alkyl. Substituents for alkyl are for example hydroxyl, cyano, halogen, phenoxy, $C_1$–$C_4$-alkoxy or phenyl.

The novel azo compounds of the formula (1) can be prepared by methods known per se, for example by diazotising an o-nitroaniline of the formula

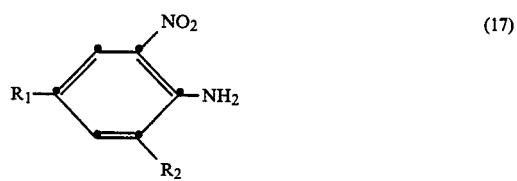

and coupling onto a coupling component of the formula HKK, $R_1$, $R_2$ and KK being as defined in the formula (1).

The diazotisation and coupling reaction can be carried out in conventional manner, as described for example in Ullmann's Enzyclopadie der technischen Chemie [Encyclopaedia of chemical technology], volume 5 (1954), pages 783 et seq. For example, the diazotisation of the amines of the formula (17) by means of sodium nitrite is carried out in an acid, for example hydrochloric acid, acetic acid, propionic acid, sulfuric acid or phosphoric acid, aqueous medium. However, the diazotisation can also be carried out using other diazotising agents, for example nitrosylsulfuric acid. During the diazotisation an additional acid can be present in the reaction medium, examples being phosphoric acid, sulfuric acid, acetic acid, propionic acid, hydrochloric acid or mixtures of these acids, for example mixtures of phosphoric acid and acetic acid. Advantageously the diazotisation is carried out at temperatures of $-10°$ to $30°$ C., for example $-10°$ C. to room temperature.

The coupling of the diazotised amine of the formula (17) onto the coupling component is likewise effected in known manner, for example in an acid, aqueous or aqueous organic medium, advantageously at temperatures of $-10°$ to $30°$ C., in particular below $10°$ C. The acids used can be for example hydrochloric acid, acetic acid, sulfuric acid or phosphoric acid. Diazotisation and coupling can be carried out for example using the single-vessel method, i.e. in the same reaction medium.

The coupling components HKK are known from the literature (see also above list of preferred classes of coupling components).

The o-nitroanilines of the formula (17) which are used as diazo components can be prepared for example by alkylation or aralkylation reactions known per se. For example, an o-nitroaniline is reacted at elevated temperature and in the presence of an aqueous acid catalyst with an alkylating or aralkylating reagent which introduces one or two $C_3$–$C_8$-alkyl groups or one or two groups of the formula (1a) into the molecule.

For example, compounds of the formula (17) in which only one of the two radicals $R_1$ or $R_2$ is $C_3$–$C_8$-alkyl or a group of the formula (1a) are prepared by reacting an o-nitroaniline of the formula

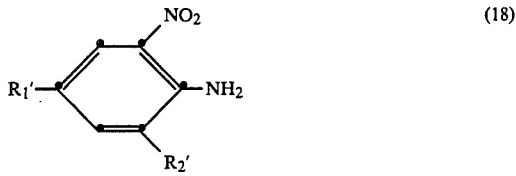 (18)

in which either $R_1'$ or $R_2'$ is hydrogen or one thereof is hydrogen and the other is $C_1$–$C_4$-alkyl or halogen with upto 1 mol of an alkylating or aralkylating agent.

If $R_1$ and $R_2$ are to be $C_3$–$C_8$-alkyl or a group of the formula (1a), 1 mol of an o-nitroaniline of the formula (18) in which $R_1'$ and $R_2'$ are hydrogen is reacted with at least 2 mol of the alkylating or aralkylating agent. This method can also be carried out in two stages by reacting in a first stage first with an alkylating or aralkylating agent and in a second stage with the same or with an alkylating or aralkylating agent which is different from the first.

The reaction is carried out at elevated temperature in an aqueous acid medium. The reaction is preferably carried out in the presence of a metal salt as a catalyst. It is also possible to use an organic solvent at the same time.

The alkylating or aralkylating reagents used contain as the reactive centre for example an olefinic, hydroxyl, amino, halogen, acetoxy or ether group which in the course of the reaction is eliminated, converted or added.

The reaction temperature is for example within the range $50°$–$200°$ C., preferably $100°$–$150°$ C. The acid used can be for examle: hydrochloric acid, sulfuric acid and also phosphoric acid; alkyl-, aryl- and aralkyl-substituted inorganic acids, for example methanesulfonic or ethanesulfonic acid, benzenesulfonic acid, p-toluenesulfonic acid, methanephosphoric acid, dichloro-, trichloro- and trifluoro-acetic acid. The amount of acid is for example 0.25–2 mol per mol of nitroaniline of the formula (18).

The catalysts can be for example salts, oxides, hydroxides or carbonates of metals of groups IIA, IIB, IIIA, IIIB or VIII of the periodic table. Preferred metals are Mg, Cd, Zn, Al, Fe, Co or Ni. A particularly preferred catalyst is $ZnCl_2$.

Examples of o-nitroanilines of the formula (18) are: 2-nitroaniline, 4-methyl-2-nitroaniline, 6-methyl-2-nitroaniline, 4-ethyl-2-nitroaniline, 4n-propyl-2-nitroaniline, 4-isopropyl-2-nitroaniline, 4-n-butyl-2-nitroaniline, 4-sec.-butyl-2-nitroaniline, 4-t-butyl-2-nitroaniline, 4-n-octyl-2-nitroaniline, 4-(1,1,3,3-tetramethylbutyl)-2-nitroaniline, 4-chloro-2-nitroaniline, 6-chloro-2-nitroaniline.

Alkylating or aralkylating agents are for example olefines, alcohols, ethers, alkyl- or aralkyl-amines, alkyl or aralkyl halides, alkyl or aralkyl acetates. Examples thereof are: benzyl alcohol, benzyl methyl ether, benzyl chloride, benzyl acetate, benzylamine, 2-chlorobenzyl alcohol, 3-chlorobenzyl alcohol, 4-chlorobenzyl alcohol, 2-methylbenzyl alcohol, 3-methylbenzyl alcohol, 4-methylbenzyl alcohol, alcohol, α-methylbenzyl alcohol, α-methylbenzylamine, styrene, 2-methylstyrene, 3-methyl-styrene, 4-methylstyrene, 2-chlorostyrene, 3-chlorostyrene, 4-chlorostyrene, α-methylstyrene, cumyl alcohol, cumyl acetate, β-methylstyrene, allylbenzene, 4-chloro-α-methylstyrene, 4-chlorocumyl alcohol, 4-isopropyl-α-methylstyrene, tert.-butyl chloride, isopropyl chloride or mixtures of these compounds.

Examples of the diazo components of the formula (17) are the following compounds: 4-benzyl-2-nitroaniline, 6-benzyl-2-nitroaniline, 4-(α-methylbenzyl)-2-nitroaniline, 6-(α-methylbenzyl)-2-nitroaniline,4-(-ethylbenzyl)-2-nitroaniline, 6-(α-ethylbenzyl)-2-nitroaniline, 4-cumyl-2-nitroaniline, 4-(4-methyl-α-methylbenzyl)-2-nitroaniline, 6-(4-methyl-α-methylbenzyl)-2-nitroaniline, 4-(4-isopropyl-α,α-dimethylbenzyl)-2-nitroaniline, 4-(2-chloro-α-methylbenzyl)-2-nitroaniline, 6-(2-chloroα-methylbenzyl)-2-nitroaniline, 4-(3-chloro-α-methylbenzyl)-2-nitroaniline, 6-(3-chloro-α-methylbenzyl)-2-nitroaniline, 4-(4-chloro-α-methylbenzyl)-2-nitroaniline, 6-(4-chloro-αmethylbenzyl)-2-nitroaniline, 4-(4-chloro-α,α-dimethylbenzyl)-2-nitroaniline, 6-benzyl-4-methyl-2-nitroaniline, 6-methyl-4-(α-methylbenzyl)-2-nitroaniline, 4-methyl-6-(α-methylbenzyl)-2-nitroaniline, 6-(α-ethylbenzyl)-4-methyl-2-nitroaniline, 4-cumyl-6-methyl-6-methyl-2-nitroaniline, 4-methyl-6-(4-methyl-α-methylbenzl)-2-nitroaniline, 6-methyl-4-(4-isopropyl-α,α-dimethylbenzyl)-2-nitroaniline, 6-(2-chloro-α-methylbenzyl)-4-methyl-2-nitroaniline, 6-(3-chloro-methylbenzyl)-4- methyl-2-nitroaniline, 6-(4-chloro-α-methylbenzyl)-4-methyl-2-nitroaniline, 4-(4-chloro-α,α-dimethylbenzyl)-6-methyl-2-nitroaniline, 6-benzyl-4-t-butyl-2-nitroaniline, 4-t-butyl-6-(α-methylbenzyl)-2-nitroaniline, 4-t-butyl-6-ethylbenzyl)-2-nitroaniline, 4-t-butyl-6-(4-methyl-α-methylbenzyl)-2-nitroaniline, 4-t-butyl-6-(2-chloro-methylbenzyl)-2-nitroaniline, 4-t-butyl-6-(3-chloro-α-methylbenzyl)-2-nitroaniline, 4-t-butyl-6-(4-chloro-α-methylbenzyl)-2-nitroaniline, 6-(α-methylbenzyl)-4-(1,1,3,3-tetramethylbutyl)-2-nitroaniline, 6-(4-methyl-α-methylbenzyl)-4-(1,1,3,3-tetramethylbutyl)-2-nitroaniline, 6-(4-chloro-α-methylbenzyl)-4-(1,1,3,3-tetramethylbutyl)-2-nitroaniline, 4-chloro-6-benzyl-2-nitroaniline, 4-chloro-6-(α-methylbenzyl)-2-nitroaniline, 4-chloro-6-(α-ethylbenzyl)-2-nitroaniline, 4-chloro-6-(4-methyl-α-methylbenzyl)-2-nitroaniline, 4-chloro-6-(4-chloro-α-methylbenzyl)-2-nitroaniline, 4,6-dibenzyl-2-nitroaniline, 4,6-bis-(α-methylbenzyl)-2-nitroaniline, 4,6-bis-(α-ethylbenzyl)-2-nitroaniline, 4,6-bis-(4-methyl-α-methylbenzyl)-2-nitroaniline, 4,6-bis-(4-chloro-α-methylbenzyl)-2-nitroaniline, 4-cumyl-6-(α-methylbenzyl)-2-nitroaniline, 4-(4-chloro-α-methylbenzyl)-4-(4-methyl-α-methylbenzyl)-2-nitroaniline, 4-t-butyl-2-nitroaniline, 4-isopropyl-2-nitroaniline, 4-t-butyl-6-ethyl-2-nitroaniline, 4-(α,α-dimethylbenzyl)-6-methyl-2-nitroaniline, 4-(α,α-dimethylbenzyl)-2-nitroaniline, 4-(α,α-dimethylbenzyl-6-n-butyl-2-nitroaniline.

The compounds of the formula (17) in which $R_1$ or/and $R_2$ are $C_3$–$C_8$-alkyl are also known from the literature or can be prepared by methods described therein.

The compounds according to the invention of the formula (1) can be used as dyes for dyeing and printing semi-synthetic and, in particular, synthetic hydrophobic fibre materials, especially textile materials. Textile materials made of blend fabrics which contain such cellulosic or synthetic hydrophobic textile materials can likewise be dyed or printed by means of the compounds according to the invention.

Semi-synthetic textile materials are in particular cellulose 2½-acetate and cellulose triacetate.

Synthetic hydrophobic textile materials consist in particular of linear aromatic polyesters, for example those composed of terephthalic acid and glycols, in particular ethylene glycol, or condensation products of terephthalic acid and 1,4-bis-(hydroxymethyl)-hexahydrobenzene; of polycarbonates, for example those composed of α,α-dimethyl-4,4'-dihydroxydiphenylmethane and phosgene; and of fibres based on polyvinyl chloride and on polyamides.

The compounds according to the invention are applied to the textile materials by known dyeing methods. For example, polyester fibre materials are dyed by the exhaust method from aqueous dispersions in the presence of customary anionic or nonionic dispersants and if desired customary swelling agents (carriers) at temperatures between 80° and 140° C. Cellulose 2½-acetate is preferably dyed between about 65° and 85° C. and cellulose triacetate at temperatures of up to 115° C.

The novel dyes dye wool and cotton present at the same time in the dyebath not at all or only to a small degree (very good reservation), so that they can also be advantageously used for dyeing the polyester portion in polyester/wool and polyester/cellulosic blend fabrics.

The dyes according to the invention are also suitable for dyeing by the Thermosol method.

The stated textile material can be present in a very wide range of processed forms, for example as fibre, thread or web or as woven or knitted fabric.

It is advantageous to convert the dyes according to the invention before their use into a dye preparation. To this end, the dye is ground, so that its particle size is on average between 0.01 and 10 micron. The grinding can take place in the presence of dispersants. For example, the dried dye is ground together with the dispersant or is kneaded in paste form together with the dispersant and thereafter is dried in vacuo or by spray-drying. The preparations thus obtained can be used after the addition of water for dyeing and printing.

In printing, use is made of the customary thickening agents, for example modified or unmodified natural products, for example alginates, british gum, gum arabic, crystal gum, carob bean flour ether, tragacanth, carboxymethylcellulose, hydroxyethylcellulose, starch or synthetic products, for example polyacrylamides, polyacrylic acid or copolymers thereof or polyvinyl alcohols.

The dyes according to the invention are practically impervious to carriers and produce on the stated material, especially the polyester material, level shades having very good end-use fastness properties, in particular good light fastness, good sublimation fastness, heat-setting, pleating, chlorine and wet fastness such as water, perspiration and wash fastness; the dyeings are further characterised by good pH stability and very good rub fastness. The results are in addition very deep dyeings which do not undergo catalytic fading. Many of the dyes according to the invention are also fast to sublimation.

The dyes according to the invention can also be advantageously used for preparing mixed shades together with other dyes. It is of course also possible to use mixtures of the dyes according to the invention with one another.

The abovementioned use of the azo compounds according to the invention of the formula (1) is similarly part of the subject-matter of the present invention as is a process for dyeing or printing semi-synthetic or synthetic hydrophobic fibre material, in particular textile material, which comprises applying or incorporating one or more compounds of the formula (1) to or into the stated material. the stated hydrophobic fibre material is preferably textile polyester material. Further substrates which can be treated by means of the process according to the invention and preferred processing conditions can be found above in the detailed explanation of the use of the compounds according to the invention.

Also part of the subject-matter of the invention is the hydrophobic fibre material, preferably polyester textile material, dyed or printed by the stated method.

The examples which follow illustrate the invention in more detail without limiting it thereto. Parts and percentages are by weight unless otherwise stated. Melting points are uncorrected.

EXAMPLE 1

12.8 g (0.05 mol) of 4-(α,α-dimethylbenzyl)-2-nitroaniline are dissolved in 85 ml of glacial acetic acid and 15 ml of propionic acid. The solution has added to it 12.5 ml of 32% hydrochloric acid, is cooled down to 0° C. and is diazotised at 0° to 5° C. (cooling with ice) using 12.5 ml of 4M sodium nitrite solution in the course of 10 minutes and is then stirred at 0° to 5° C. for 45 minutes. The diazonium salt solution is then added dropwise at 0° to 10° C. (with cooling) to a solution of 9.4 g (0.053 mol) of 1-ethyl-3-cyano-4-methyl-6-hydroxypyrid-2-one in 200 ml of water and 5 ml of 30% sodium hydroxide solution in the course of about 20 minutes during which the pH is maintained at 4 with dilute aqueous ammonia. After one hour of stirring at a maximum temperature of 10° C., the resultant precipitate is filtered off with suction, is washed with dilute ammonia and then with water and is dried at 80° C. in vacuo. This gives 20.7 g of the azo compound of the formula

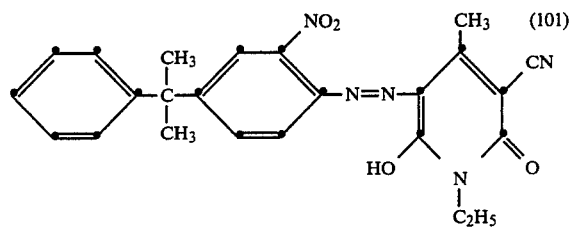

(101)

as an orange-yellow powder which, after sintering at 180° C., melts at 213°–216° C. After twice recrystallising from ethyl acetate the melting point is 221°–222° C. (sintering at 216° C.). Hue on polyester: yellow.

EXAMPLE 2

Example 1 is repeated, using as starting materials o-nitroanilines which are appropriately substituted in the 4-position and appropriately N-substituted pyridones. This gives the azo compounds of the formula

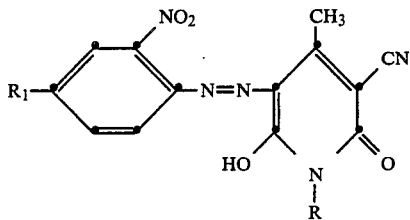

specified in Table 1.

TABLE 1

| Compound No. | $R_1$ | R | Melting point (°C.) |
|---|---|---|---|
| 201 | (α,α-dimethylbenzyl, $C(CH_3)_2$-phenyl) | H | 308–310 |
| 202 | " | $CH_3$ | 254–258 |
| 203 | " | $n-C_4H_9$ | 170–172 |
| 204 | $t-C_4H_9$ | $C_2H_5$ | 248–249 |
| 205 | $t-C_4H_9$ | H | 310–312 |

Hue of compounds 201–205 on polyester: yellow.

EXAMPLE 3

Example 1 is repeated, using as starting materials appropriately substituted o-nitroanilines as diazo components and appropriately N-substituted pyridones as coupling components, affording the compounds of the formula

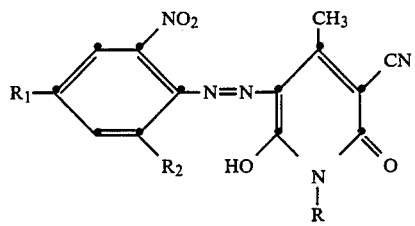

specified in Table 2.

TABLE 2

| Compound No. | $R_1$ | $R_2$ | R |
|---|---|---|---|
| 301 | $-CH_2-$phenyl | H | $CH_3$ |
| 302 | " | H | $C_2H_5$ |
| 303 | " | H | $-(CH_2)_3CH_3$ |
| 304 | " | H | $-CH_2CH(C_2H_5)(CH_2)_3CH_3$ |
| 305 | $-CH(CH_3)-$phenyl | H | $-(CH_2)_2CH_3$ |
| 306 | " | H | $-CH(CH_3)_2$ |

TABLE 2-continued

| Compound No. | R₁ | R₂ | R |
|---|---|---|---|
| 307 | " | H | —CH(CH₃)(C₂H₅) |
| 308 | —CH(CH₃)₂ | H | —(CH₂)₃CH₃ |
| 309 | " | H | —(CH₂)₂—C₆H₅ |
| 310 | —CH(CH₃)—(2-Cl-C₆H₄) | H | C₂H₅ |
| 311 | —C(CH₃)₂—(4-Cl-C₆H₄) | H | CH₃ |
| 312 | —C(C₂H₅)—C₆H₅ (with additional bond) | H | C₂H₅ |
| 313 | CH₃ | —CH(CH₃)—(4-Cl-C₆H₄) | CH₃ |
| 314 | CH₃ | —CH(CH₃)—(3-Cl-C₆H₄) | C₂H₅ |
| 315 | —C(CH₃)₂—C₆H₅ | H | —CH₂CH₂OH |
| 316 | " | H | —(CH₂)₃—O—CH(CH₃)₂ |
| 317 | " | H | —CH₂CHCH₃ \| OH |
| 318 | " | H | —CH₂CH₂—O—C₆H₅ |

Hue of compounds 301–308 on polyester: yellow.

EXAMPLE 4

Example 1 is repeated, except that the pyridone coupling component is replaced by 4-nitrodiphenylamine, 3-methyl-N,N-di-(2-hydroxyethyl)-aniline, 3-acetylamino-N,N-diethylaniline, phenol, 1-phenyl-3-methyl-5-hydroxypyrazole, acetoacet-o-anisidide, 6-(N-methyl-N-hydroxyethylsulfonamido)-2-naphthol, 3-(N-o-ethoxyphenylcarboxamido)-2-naphthol, 2-phenylindole, 6-(N-methylsulfonamido)-2-naphthylamine, 2,4-diamino-5-cyano-6-piperidino-1-pyridine, 2,6-diaminopyridine, 1-methyl-4-hydroxyquinol-2-one, 2-methylindole or 1-phenyl-2-amino-4-methylpyrazole, affording the following compounds of the formulae:

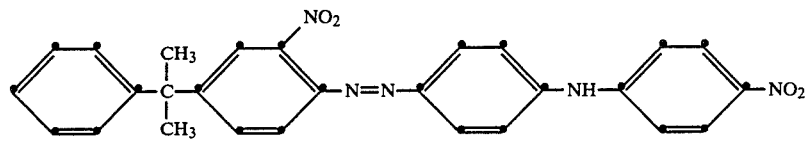 (401)
Melting point: 196–199° C. (sintering at 191° C.).
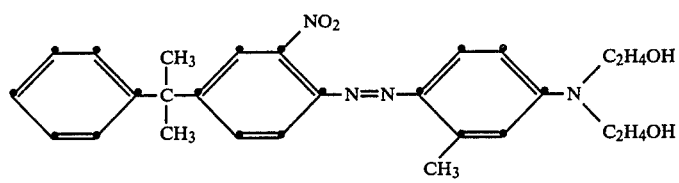 (402)
Amorphous. Hue on polyester: orange.
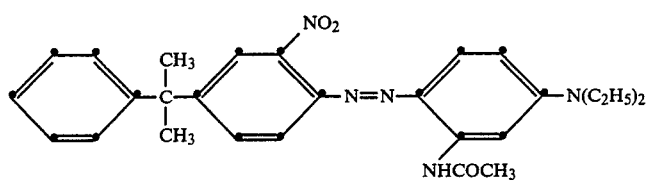 (403)
Melting point 112–114° C. Hue on polyester: scarlet.
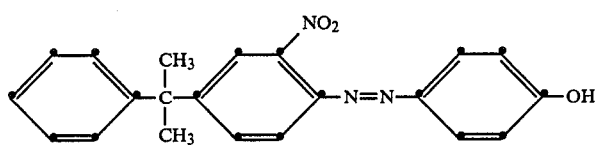 (404)
Amorphous. Hue on polyester: brownish yellow.
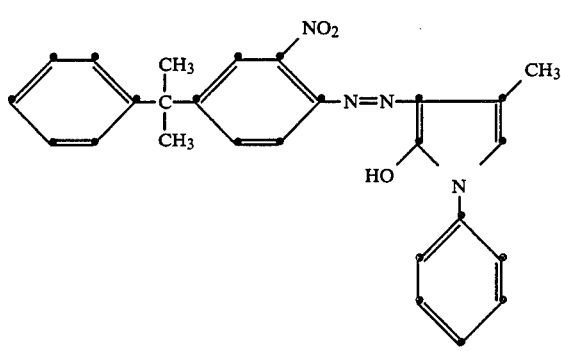 (405)
Melting point: 120–123° C. Hue on polyester: yellow.
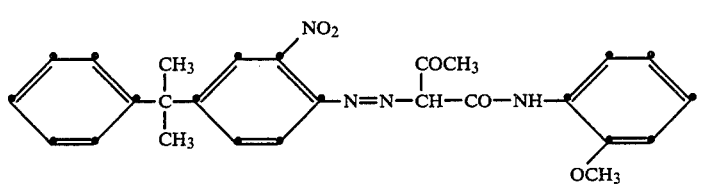 (406)
Melting point: 200–203° C. Hue on polyester: yellow.
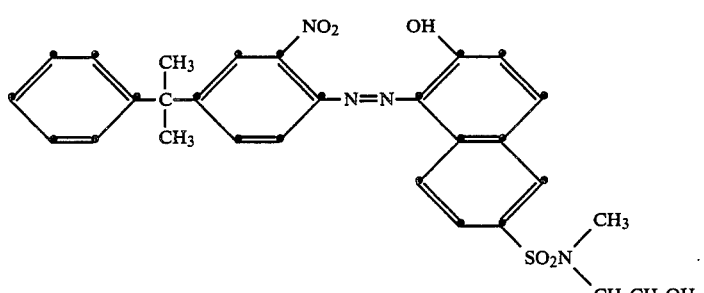 (407)
Melting point: 205–209° C. Hue on polyester: red.

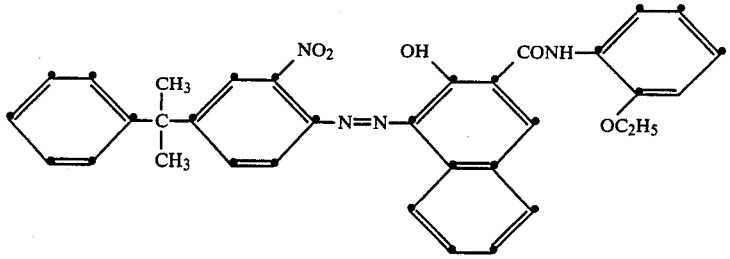
(408)
Melting point: 194–200° C. Hue on polyester: red.
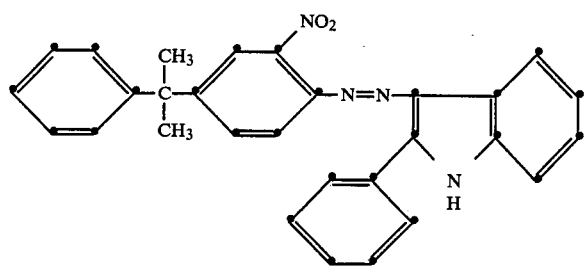
(409)
Melting point: 173–177° C. Hue on polyester: orange.
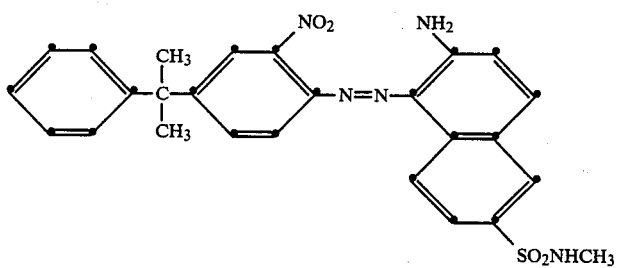
(410)
Melting point: 210–215° C. Hue on polyester: red.
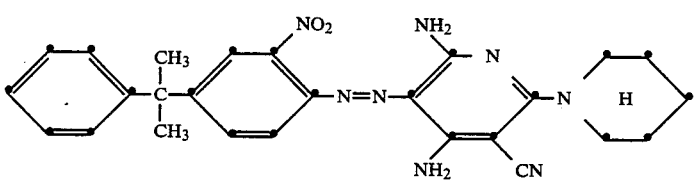
(411)
Melting point: 125–130° C. Hue on polyester: orange.
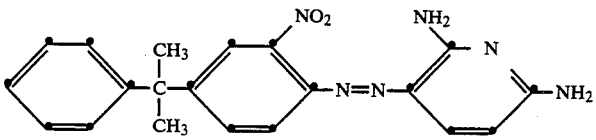
(412)
Melting point: 140–145° C. Hue on polyester: scarlet.
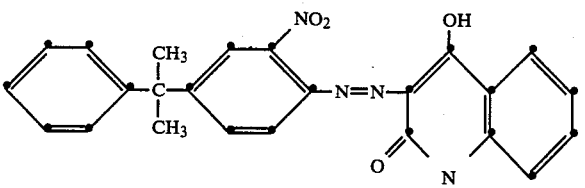
(413)
Melting point: 178–185° C.
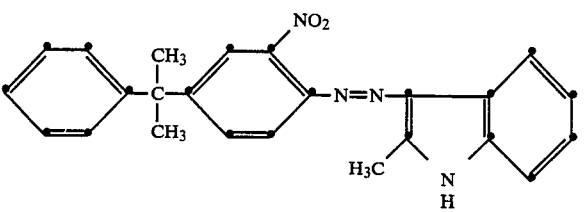
(414)
Melting point: 95–98° C.

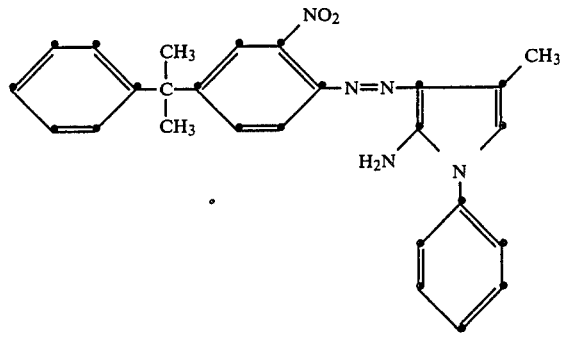

(415)

Melting point: 170–175° C. Hue on polyester: yellow.

EXAMPLE 5

The 4-(α,α-dimethylbenzyl)-2-nitroaniline required as a starting material for preparing the compounds of the formulae 101, 201–203, 311, 315–318 and 401–415 can be obtained as follows:

27.6 parts of o-nitroaniline are added to a solution of 13.4 parts of anhydrous $ZnCl_2$ in 20.4 parts of 36% hydrochloric acid. The mixture, which has been heated to the reflux temperature, has added to it dropwise, with stirring, 23.6 parts of α-methylstyrene in the course of 1 hour. After two hours of stirring at the reflux temperature the hot reaction mixture is poured into a solution of 50 parts of sodium hydroxide in 100 parts of water. After 15 minutes of stirring the mixture is allowed to cool down, whereupon the organic phase solidifies. Filtration, washing with water, drying and recrystallisation of the same from ethanol gives 4-(α,α-dimethylbenzyl)-2-nitroaniline as orange-coloured crystals having a melting point of 92°–94° C.

In a similar way it is possible to prepare the o-nitroanilines which are listed in Table 3 below and which can be used as starting compounds of the formula 17 for preparing dyes according to the invention of the formula 1.

TABLE 3

| Compound | Melting point (°C.) |
| --- | --- |
| 4-Benzyl-2-nitroaniline | 80–83 |
| 6-Benzyl-2-nitroaniline | 90–93 |
| 4-(α-Methylbenzyl)-2-nitroaniline | 96–98 |
| 6-(αMethylbenzyl)-2-nitroaniline | 70–73 |
| 4,6-bis-(α-Methylbenzyl)-2-nitroaniline | (*) |
| 4-(α-Ethylbenzyl)-2-nitroaniline | 83–85 |
| 4-(4-Methyl-α-methylbenzyl)-2-nitroaniline | 92–95 |
| 4-(4-Isopropyl-α,α-dimethylbenzyl)-2-nitroaniline | 109–111 |
| 4-(2-Chloro-α-methylbenzyl)-2-nitroaniline | 97–100 |
| 4-(4-Chloro-α-methylbenzyl)-2-nitroaniline | 122–125 |
| 4-(4-Chloro-α,α-dimethylbenzyl)-2-nitroaniline | 83–85 |
| 4-Methyl-6-(4-methyl-α-methylbenzyl)-2-nitroaniline | 107–109 |
| 6-(α-Ethylbenzyl)-4-methyl-2-nitroaniline | 107–110 |
| 6-Methyl-4-(α,α-dimethylbenzyl)-2-nitroaniline | 119–121 |
| 4-Methyl-6-(4-methyl-α-methylbenzyl)-2-nitroaniline | 150–153 |
| 6-(4-Chloro-α-methylbenzyl)-4-methyl-2-nitroaniline | 120–123 |
| 4-Chloro-6-(α-methylbenzyl)-2-nitroaniline | 93–95 |
| 6-(2-Chloro-α-methylbenzyl)-4-methyl-2-nitroaniline | 100–103 |

(*) boiling point 220° C. at 0.4 mb

The 4-t-butyl-2-nitroaniline (melting point 102.5–105.5) required for preparing the compounds of the formulae 204 and 205 is known, for example from C.A. Vol. 46(1952), 1493i.

EXAMPLE 6

1 part of the azo compound of the formula 101, 202 or 203 is ground wet with in each case 2 parts of a 50% aqueous solution of the sodium salt of dinaphthylmethanedisulfonic acid and is dried.

0.012 part of this dye preparation are stirred together with 0.1 part of sodium oleoylmethyltaurate, 0.1 part of sodium dinaphthylmethanedisulfonate and 0.5 part of ammonium sulfate. By diluting with water a dyebath of 200 parts is prepared therefrom and is brought to pH 5 with 85% aqueous formic acid. 10 parts of a Diolen fabric (polyester) are added at 50° C. to this bath, the temperature is raised in a sealed vessel to 120° C. in the course of 30 minutes and then to 130° C. in the course of a further 10 minutes. This is followed by thorough rinsing. The result obtained in each case is a deep yellow dyeing, and the dye has exhausted very well from the dyebath. This dyeing is stable, does not undergo catalytic fading and is very fast to sublimation.

EXAMPLE 7

40 g of a wound package of a polyester-wool blend fabric (55% polyester content, 45% wool content, prewashed, dried at 140° C. and heat-set at 180° C. for 30 seconds) are put into 360 ml of a preheated aqueous dyebath at 60° C. containing 0.1 g of the azo compound of the formula 101, 202 or 203, 0.2 g of a wool-levelling agent, 0.72 g of ammonium sulfate, 1.08 g of a carrier (based on trichlorobenzene) and brought to pH 5.5 with 85% aqueous formic acid. (Pretema-Multicolor apparatus). The temperature of this dyebath is raised to 105° C. in the course of 30 minutes and dyeing is carried out for 45 minutes. The dyebath is then allowed to cool down to 80° C., and the dyed material is rinsed twice at 70° C. for 5 minutes and once with cold water for 5 minutes. The result obtained in each case is a level yellow-coloured polyester-wool blend fabric, the dyeing having very good rub fastness and sublimation fastness.

Dyeing examples 6 and 7 are repeated using compounds 201, 204, 205, 301–318 or 401–415 as dyes, likewise affording good dyeings having the shade listed for each compound.

What is claimed is:

1. A monoazo compound of the formula

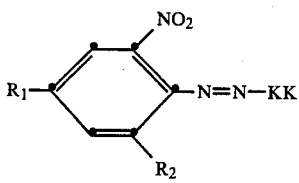

wherein one of the two substituents $R_1$ or $R_2$ or both are a group of the formula

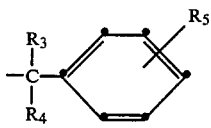

in which $R_3$ and $R_4$ are independently of each other hydrogen or $C_1-C_4$-alkyl and $R_5$ is hydrogen, halogen or $C_1-C_4$-alkyl; and, if one of $R_1$ or $R_2$ is not a group of the formula (1a), that group is hydrogen, halogen or $C_1-C_4$-alkyl; and KK is a pyridone radical of the formula

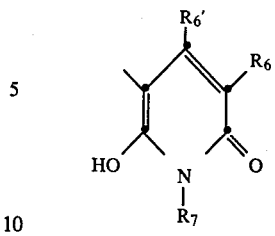

in which $R_6$ is $C_1-C_8$-alkyl, CN, $CONH_2$ or $SO_2NH_2$, $R_6'$ is $C_1-C_8$-alkyl and $R_7$ is hydrogen, $C_2-C_8$-alkenyl, naphthyl, phenyl, $C_1-C_8$-alkyl which is unsubstituted or substituted by hydroxyl, cyano, halogen, $C_1-C_4$-alkoxy, phenoxy, phenyl, amino, $C_1-C_8$-alkylamino or $C_1-C_8$-dialkylamino.

2. A compound according to claim 1 wherein only one of $R_1$ or $R_2$ is a group of formula (1a).

3. A compound according to claim 2 wherein $R_1$ is a group of formula (1a).

4. A compound according to claim 3 wherein $R_2$ is hydrogen, $R_6'$ is methyl, and $R_6$ is cyano.

5. A compound according to claim 4 wherein at least one of $R_3$ and $R_4$ in formula (1a) is methyl.

6. A compound according to claim 5 wherein both $R_3$ and $R_4$ are methyl, $R_5$ is hydrogen, and $R_7$ is hydrogen, methyl, ethyl, i- or n-propyl, or n-, sec- or t-butyl, or hydroxymethyl, hydroxyethyl or hydroxypropyl or 2-phenoxyethyl.

7. A compound according to claim 5 wherein $R_3$ is methyl, $R_4$ is hydrogen, $R_5$ is hydrogen, and $R_7$ is methyl, ethyl, i- or n-propyl, or n-, sec- or t-butyl.

8. A compound according to claim 5 wherein $R_3$ is methyl, $R_4$ is hydrogen, $R_5$ is ortho or meta-chloro and $R_7$ is methyl, ethyl, i- or n-propyl or n-, sec- or t-butyl.

9. A compound according to claim 4 wherein $R_3$, $R_4$ and $R_5$ are hydrogen and $R_7$ is methyl, ethyl, i- or n-propyl, or n-, sec- or t-butyl.

* * * * *